Patented June 16, 1953

2,642,438

UNITED STATES PATENT OFFICE 2,642,438

PYRIDINDOLES AND METHOD OF MANUFACTURE

Robert Duschinsky, Essex Fells, N. J., assignor to Hoffmann-La Roche Inc., Nutley, N. J., a corporation of New Jersey No Drawing. Application July 15, 1949, Serial No. 105,061

11 Claims. (Cl. 260—296)

1

The present invention relates to 9-R-2-R₁-1,2,3,4-tetrahydro-9H-pyrid(3,4-b)indoles, the salts thereof, and the process for producing the novel compounds, R being an aryl or aralkyl radical, such as a phenyl or benzyl radical, and R₁ being hydrogen or a lower alkyl radical, such as methyl, ethyl, and the like. The new compounds have useful medicinal properties, for example, as spasmolytics and adrenolytics.

Chemically the compounds, in the form of their free bases, can be represented by the following formula:

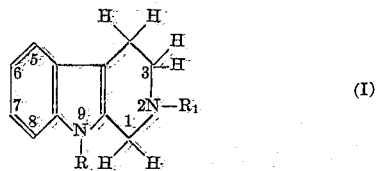

(I)

wherein R and R₁ have the same meaning already assigned thereto.

In general, the new compounds (I) can be prepared by reacting with formaldehyde a 1-R-3-(β-aminoethyl)indole (II), of the following formula:

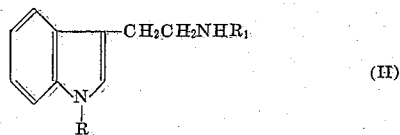

(II)

preferably in the form of its salt, R and R₁ having the same meaning as mentioned above.

The indoles (II) are new compounds. They can be prepared by reacting a 1-R-1-phenyl-hydrazine with diethyl γ-aminobutyracetal, in the presence of an acid condensing agent, such as hydrochloric acid. The reaction results in the corresponding salt of the 1-R-3-(β-R₁NHC₂H₄)-indoles (II) wherein R₁ is hydrogen. In order to obtain the corresponding indoles where R₁ is a lower alkyl radical such as methyl, the indole wherein R₁ is hydrogen is alkylated by known methods such as, for example, by first reacting the indole with p-toluenesulfonyl chloride, then alkylating the resulting 1-R-3-(β-tosylaminoethyl)indole as, for example, with methyl iodide, and subsequently removing the tosyl radical, from the 1-R-3-(N-methyl-β-tosylaminoethyl)indole.

In the reaction with formaldehyde and the salts of the 1-R-3-(β-R₁NHC₂H₄)indoles (II), the

2 corresponding salts of the pyridindole compound (I) are directly obtained. The salts of compounds (I) and (II) can be converted to the free bases by treatment with an alkaline compound, such as ammonia, sodium hydroxide or sodium carbonate, and the like. To form the quaternary ammonium salts, the free bases are treated with a quaternizing agent, such as an alkyl halide, for example, methyl iodide, ethyl iodide, methyl p-toluene sulfonate, dimethyl sulfate, and the like.

The free base (I) where R₁ is hydrogen, as well as the free base (II) can be acylated by treatment with an acid anhydride or acid chloride, or by employing a carboxylic acid at elevated temperature. Thus, the present invention also embraces the N-monoacylated derivatives of compounds (I) and (II).

The following examples will serve to illustrate the invention:

EXAMPLE 1

*1-phenyl-3-(β-aminoethyl)indole*

To a solution of 2.4 grams of as-diphenylhydrazine hydrochloride in 10 cc. of water heated to 50–60° C. there were added 1.61 grams of diethyl γ-aminobutyracetal. The mixture was heated to 90° C. and 6 cc. of concentrated (37–38.5%) hydrochloric acid were added whereupon the temperature rose to 105° C. Upon cooling 1-phenyl-3-(β-aminoethyl)indole hydrochloride crystallized. The compound was washed with water, then with Dry Ice-cooled ethanol and finally with ether. After recrystallization from ethanol, the compound melted at 237–239° C. The free base was readily obtained as an oil by treating the hydrochloride with sodium hydroxide solution.

Upon mixing the free base with acetic anhydride and permitting the reaction mixture to stand at 20–30° C. for 16 hours, the acetyl derivative, 1-phenyl-3-(β-acetylaminoethyl)indole was obtained. After washing with a 5% sodium carbonate solution and recrystallization from aqueous ethanol, the compound melted at 132–133° C.

An ether solution of the base obtained from 1 gram of 1-phenyl-3-(β-aminoethyl)indole hydrochloride by treatment with a sodium hydroxide solution was shaken with 2 grams of methyl iodide and 3 cc. of 5 N sodium hydroxide solution. A crystalline mass of [2-(1'-phenyl-3'-indolyl)ethyl]trimethylammonium iodide formed which after purification by dissolving in ethanol and precipitating with ether, melted at 190–191° C.

EXAMPLE 2

9-phenyl-1,2,3,4-tetrahydro-9H-pyrid(3,4-b)indole

A solution of 8.76 grams of 1-phenyl-3-(β-aminoethyl)indole hydrochloride in 160 cc. of water was heated to 70° C. and mixed with 6.4 cc. of 38.5% formaldehyde. The mixture was permitted to stand for two minutes at 70° C. and then filtered through charcoal. The filtrate on cooling yielded crystals of the 9-phenyl-1,2,3,4,-tetrahydro-9H-pyrid(3,4-b)indole hydrochloride. The compound, after washing with ethanol and ether, melted at 260–262° C.

The free base was obtained by treating 9.47 grams of the hydrochloride with 6.5 cc. of 5 N sodium hydroxide and 100 cc. of water. The oil which separated was extracted with ether, the ether extract was dried with sodium sulfate and the ether was evaporated. The residue was an oily base which became crystalline upon standing.

The quaternary p-toluenesulfonate salt was obtained in the following manner: A solution of 1.24 grams of 9-phenyl-1,2,3,4-tetrahydro-9H-pyrid-(3,4-b)indole in 10 cc. of ether was mixed with 0.93 gram of methyl p-toluenesulfonate. The solution became cloudy and an oil precipitated. The supernatant liquid was evaporated and the residue was boiled with 5 cc. of N sodium hydroxide. An oil precipitated which became crystalline upon cooling and addition of ether. After washing with water and ether and after recrystallization from water, 9-phenyl-1,2,3,4-tetrahydro - 2,2 - dimethyl - 9H - pyrid(3,4 - b) indolium p-toluenesulfonate was obtained which melted at 198–199° C.

EXAMPLE 3

1-phenyl-3-(β-methylaminoethyl)indole

A mixture of 8.17 grams of 1-phenyl-3-(β-aminoethyl)indole hydrochloride, 6.3 grams of p-toluenesulfonyl chloride and 20 cc. of dry pyridine was refluxed for 1¼ hours. After evaporation of the major part of the pyridine in vacuo, 40 cc. of ether and 40 cc. of water were added. The ether layer which formed was separated and washed three times with 5 cc. portions of 2 N hydrochloric acid and then three times with 5 cc. portions of one N sodium hydroxide solution and finally with 25 cc. of water. After drying over potassium carbonate and evaporation of the ether, 1-phenyl-3-(β-tosylaminoethyl)indole was obtained as a viscous oil which solidified upon cooling with Dry Ice.

The 1 - phenyl - 3 -(β - tosylaminoethyl)indole thus obtained was dissolved in 35 cc. of methanol and mixed with 5 cc. of 50% sodium hydroxide solution and 5 cc. of methyl iodide. After standing for 16 hours an oil precipitated which was washed by dissolving the oil in methanol, chilling the solution in Dry Ice and decanting the liquids from the solidified 1-phenyl-3-(N-methyl-β-tosylaminoethyl)indole.

The 1-phenyl - 3 - (N - methyl - β - tosylaminoethyl)indole thus obtained was mixed with 20 cc. of aniline and 40 grams of aniline hydrochloride and the mixture was maintained at 200° C. for 4½ hours in an atmosphere of carbon dioxide. After cooling, the mixture was taken up with 40 cc. of ether and 40 cc. of water. The aqueous layer which formed was made strongly alkaline with 50% sodium hydroxide and the resultant oil was extracted with ether. The ether extract was washed with a small amount of water and steam distilled to remove the aniline. The nonvolatile oily residue was taken up with ether and dried over sodium hydroxide. After filtering the solution and adding a small amount of ethanol, it was acidified with 15 cc. 1 N ethanolic hydrochloric acid. The crystalline 1-phenyl-3-(β-methylaminoethyl)indole hydrochloride which formed was filtered and washed with a mixture of ethanol and ether. After two recrystallizations from 20 cc. of ethanol and 10 cc. of ether, the compound melted at 158–160° C.

EXAMPLE 4

9-phenyl-2-methyl-1,2,3,4-tetrahydro-9H-pyrid(3,4-b)indole

A solution of 0.86 gram of 1-phenyl-3-(β-methylaminoethyl)indole hydrochloride in 10 cc. of water was heated at 70° C. and mixed with 0.6 cc. of 38.5% formaldehyde. After standing for two minutes at 70° C. the solution was cooled and evaporated at 35° C. in vacuo to a syrup which was dissolved in ethanol. The ethanol was evaporated, and the residue taken up with ethanol and ether. Upon cooling, 9-phenyl-2-methyl-1,2,3,4-tetrahydro-9H-pyrid(3,4-b)indole crystallized in the form of its hydrochloride. After recrystallization from ethanol-ether, the compound melted at 221–222° C.

Upon treating the hydrochloride with an excess of sodium hydroxide solution, the free base was obtained as an oil.

EXAMPLE 5

1-benzyl-3-(β-aminoethyl)indole

To a solution of 59 grams of 1-benzyl-1-phenylhydrazine hydrochloride in 250 cc. of water at 65° C. there were added 40.5 grams of diethyl γ-aminobutyracetal. After heating the mixture to 90° C., 25 cc. of concentrated (37–38.5%) hydrochloric acid were added. A spontaneous rise in temperature occurred. The solution was then cooled with ice and mixed with 300 cc. of concentrated hydrochloric acid whereupon the 1-benzyl - 3 - (β - aminoethyl)indole hydrochloride crystallized. The crystalline mass was washed with concentrated hydrochloric acid and ether. The crystals were then dissolved in 125 cc. of ethanol and recrystallized by addition of 200 cc. of ether. The product melted at 179–180° C. When 20 grams of the hydrochloride were dissolved in 55 cc. of water warmed to 60° C. and 7 cc. of 14 N sodium hydroxide solution were added, the base precipitated as an oil which was extracted with ether. After drying the ether extract and evaporation of ether, the oil solidified. The solid base melted at 59–60° C.

1.08 grams of the free base were treated with 5 cc. of acetic anhydride and the reaction mixture permitted to stand for 16 hours at 20–30° C. Upon addition of 5% sodium carbonate solution and ether, 1-benzyl-3-(β-acetylaminoethyl)indole crystallized. The compound, after washing with Dry Ice-cooled ether, melted at 102–103° C.

The corresponding propionyl derivative was obtained by refluxing the free base with a slight excess of propionic acid for 3½ hours. 1-benzyl-3 - (β - propionylaminoethyl)indole crystallized, which upon recrystallization from alcohol and petroleum ether, melted at 101–102° C.

A mixture of 1.25 grams of 1-benzyl-3-(β-aminoethyl)indole, 0.62 gram of nicotinic acid and 5 cc. of xylene was heated in an oil bath at 185° C. for sixteen hours. Water formed during the reaction was distilled off with xylene, fresh xylene being added intermittently. Upon cooling the reaction mixture, crystals separated and were purified by dissolution in boiling benzene and washing the solution with 10 cc. of N sodium hydroxide. Upon cooling, 1-benzyl-3-(β-nicotinoyl-aminoethyl)indole crystallized, melting at 147–148° C.

To a mixture of 1.21 grams of 1-benzyl-3-(β-aminoethyl)indole, 1.5 grams of sodium carbonate and 15 cc. of water there were added 1.85 grams of methyl iodide. The mixture was shaken and then refluxed for 30 minutes. The resulting oil solidified upon cooling and was washed with water and ether. The [2-(1'-benzyl-3'-indolyl)ethyl]-trimethyl ammonium iodide which formed was recrystallized from ethanol and had a melting point of 208–209° C.

EXAMPLE 6

*9-benzyl-1,2,3,4-tetrahydro - 9H - pyrid(3,4 - b) - indole*

A solution of 17.2 grams of 1-benzyl-3-(β-aminoethyl)indole hydrochloride in 300 cc. of water at 75° C. was mixed with 12.5 cc. of 38.5% formaldehyde. After standing at 75° C. for two minutes and cooling with ice, the 9-benzyl-1,2,3,4-tetrahydro-9H-pyrid(3,4-b)indole hydrochloride crystallized. After washing with water, ethanol and ether, the compound melted at 276° C. The free base was precipitated from a boiling aqueous solution of the hydrochloride by addition of 6 cc. of 5 N sodium hydroxide, and extracted from the cooled mixture with ether. The free base is a solid which melted at 80° C.

0.13 gram of the free base were treated with 0.14 gram of p-toluenesulfonyl chloride and 1 cc. of one N sodium hydroxide. 9-benzyl-2-tosyl-1,2,3,4 - tetrahydro-9H-pyrid(3,4-b)indole separated in crystalline form. It melted at 170–171° C.

When a solution of 0.52 gram of 9-benzyl-1,2,3,4-9H-tetrahydropyrid(3,4-b)indole in 25 cc. of ether was mixed with 0.37 gram of methyl p-toluenesulfonate, a crystalline mass was obtained. This was filtered from the reaction medium and proved to be the p-toluene sulfonic acid salt of 9-benzyl-1,2,3,4-9H-tetrahydro-pyrid(3,4-b)indole, M. P. 222–224° C. From the filtrate the quaternary ammonium salt, 9-benzyl-2,2-dimethyl - 1,2,3,4 - tetrahydro-9H-pyrid(3,4-b)indolium p-toluenesulfonate, M. P. 192–193° C., was obtained as follows:

The filtrate was evaporated to dryness and the residue was heated on a steam bath with 4 cc. of 0.5 N sodium hydroxide. After cooling, ether was added and the initially oily material which formed became crystalline. It was filtered and washed with water and ether. The 9-benzyl-2,2-dimethyl - 1,2,3,4 - tetrahydro-9H-pyrid(3,4-b) - indolium p-toluenesulfonate thus obtained was recrystallized from ethanol-ether.

EXAMPLE 7

*1-benzyl-3-(β-methylaminoethyl)indole*

A solution of 5 grams of 1-benzyl-3-(β-aminoethyl)indole in 45 cc. of benzene was mixed with a solution of 3.88 grams of p-toluenesulfonyl chloride in 15 cc. of benzene and 13 cc. of 10% sodium hydroxide. After shaking the reaction mixture for 10 minutes, the benzene mixture was separated and dried with sodium sulfate. Addition of ethanol and petroleum ether resulted in the formation of crystals of 1-benzyl-3-(β-tosylaminoethyl)indole, melting at about 90° C. Upon further recrystallization from ethanol-petroleum ether, the compound melted at 91–92° C.

A mixture of 6.05 grams of 1-benzyl-3-(β-tosylaminoethyl)indole, 3 grams of 50% sodium hydroxide, 3.06 grams of methyl iodide and 76 cc. of ethanol was shaken and then allowed to stand at 20–30° C. for 16 hours. Upon cooling 1-benzyl-3 - (N-methyl-β-tosylaminoethyl)indole crystallized. After washing with water and aqueous ethanol, the compound melted at 106–108° C. and after recrystallization from 85% methanol, at 108–109° C.

1.78 grams of 1-benzyl-3-(N-methyl-β-tosylaminoethyl)indole was mixed with 1.72 cc. of aniline and 3.54 grams of aniline hydrochloride. The mixture was heated in an oil bath for 4 hours at about 200° C. in an atmosphere of carbon dioxide. After cooling the reaction mixture and adding 8 cc. of water and 30 cc. of ether, 1-benzyl-3 - (β - methylaminoethyl)indole hydrochloride crystallized. The product was filtered, and washed consecutively with ice water, ethanol-ether and finally with ether. After recrystallization from ethanol, the compound melted at 213–214° C.

EXAMPLE 8

*9-benzyl-2-methyl - 1,2,3,4 - tetrahydro-9H-pyrid(3,4-b)indole*

A solution of 0.71 gram of 1-benzyl-3-(β-methylaminoethyl)indole hydrochloride in 10 cc. of water was heated at 70–80° C., and mixed with 0.5 cc. of 38.5% formaldehyde solution. The mixture was allowed to stand at 70–80° C. for 2 minutes. Upon cooling 9-benzyl - 2 - methyl-1,2,3,4-tetrahydro-9H-pyrid(3,4-b)indole hydrochloride crystallized. The product melted at 225–226° C. The base was obtained as an oil when an aqueous solution of the hydrochloride was made alkaline with sodium hydroxide.

I claim:

1. A compound of the group consisting of 9 - R - 2 - $R_1$ - 1,2,3,4 - tetrahydro - 9H - pyrid-(3,4-b)indole wherein R is a member of the group consisting of monocyclic aryl and monocyclic aralkyl radicals of the benzene series, and $R_1$ is a member of the group consisting of hydrogen and lower alkyl radicals, and lower alkyl quaternary salts and acid addition salts thereof.

2. A method for preparing 9-R-2-$R_1$-1,2,3,4-tetrahydro-9H-pyrid(3,4-b)indoles which comprises reacting a 1-R-3-(β-$R_1$NH$C_2$$H_4$)indole salt with formaldehyde, R being a member of the group consisting of monocyclic aryl and monocyclic aralkyl radicals of the benzene series and $R_1$ being a member of the group consisting of hydrogen and lower alkyl.

3. A method which comprises reacting 1-phenyl - 3(β - aminoethyl)indole hydrochloride with formaldehyde so as to obtain 9-phenyl-1,2,3,4-tetrahydro-9H-pyrid(3,4-b)indole hydrochloride.

4. A method which comprises reacting 1-phenyl-3-(β-methylaminoethyl)indole hydrochloride with formaldehyde so as to obtain 9-phenyl-2-methyl - 1,2,3,4 - tetrahydro - 9H - pyrid(3,4-b) indole hydrochloride.

5. A method which comprises reacting 1-benzyl - 3 - (β - aminoethyl)indole hydrochloride with formaldehyde so as to produce 9-benzyl-1,2,3,4 - tetrahydro - 9H - pyrid(3,4-b)indole hydrochloride.

6. A method which comprises reacting 1-benzyl-3-(β-methylaminoethyl)indole hydrochloride with formaldehyde so as to produce 9-benzyl-2- methyl - 1,2,3,4 - tetrahydro - 9H - pyrid(3,4-b)-indole hydrochloride.

7. 9 - phenyl - 1,2,3,4 - tetrahydro - 9H - pyrid-(3,4-b)indole hydrochloride.

8. 9 - phenyl - 2 - methyl - 1,2,3,4 - tetrahydro-9H-pyrid(3,4-b)indole hydrochloride.

9. 9 - benzyl - 1,2,3,4 - tetrahydro - 9H - pyrid-(3,4-b)indole hydrochloride.

10. 9 - benzyl - 2 - methyl - 1,2,3,4 - tetrahydro-9H-pyrid(3,4-b)indole hydrochloride.

11. 9 - phenyl - 1,2,3,4 - tetrahydro - 2,2 - di-methyl-9H-pyrid(3,4-b)indolium p-toluenesulfonate.

ROBERT DUSCHINSKY.

OTHER REFERENCES

Hoshino, Chemical Abstracts, vol. 29 (1935), page 2956.

Berichte der deut. Chem. Ges. 67B, pp. 2031–2035 (1934).

Tatsui: Chemical Abstracts, vol. 22 (1928), page 3415.